United States Patent [19]

Bulan et al.

[11] Patent Number: 5,089,927
[45] Date of Patent: Feb. 18, 1992

[54] POWER FEED CIRCUIT FOR DIGITAL COMMUNICATIONS TERMINAL EQUIPMENT

[75] Inventors: Sergiu Bulan, Willowdale; Johannes L. Holt, Brampton, both of Canada

[73] Assignee: Northern Telecom Limited, Montreal, Canada

[21] Appl. No.: 420,487

[22] Filed: Oct. 12, 1989

[51] Int. Cl.$^5$ .............................................. H02H 3/08
[52] U.S. Cl. ..................................................... 361/87
[58] Field of Search ...................... 361/87, 93, 100, 78, 361/66, 111; 379/2, 32, 93, 94, 412

[56] References Cited

U.S. PATENT DOCUMENTS

| | | | |
|---|---|---|---|
| 3,858,089 | 12/1974 | Poindexter | 361/120 X |
| 4,983,955 | 1/1991 | Ham, Jr. et al. | 361/93 |
| 4,987,512 | 1/1991 | Mulshine | 361/93 |

*Primary Examiner*—Steven L. Stephan
*Assistant Examiner*—E. To

*Attorney, Agent, or Firm*—J. E. Moorhouse

[57] ABSTRACT

Integrated Services Digital Network (ISDN) terminal equipments (TEs) are remotely powered from a central source via line interface circuits. One function of the line interface circuit is that of conducting energizing direct current for the associated telecommunications terminal equipment while providing effective overcurrent protection in spite of widely variable load current requirements which occasionally may mimic a faulty over current condition. The line interface circuit includes first and second power terminals for connection to a source of power, first and second line terminals for supplying said energizing direct current, and a current control means, being connected between a one of the first and second power terminals and a respective one of the first and second line terminals, for temporarily switching off an inrush current in excess of a dynamic limit, and permanently switching off a load current in excess of a static limit until a virtual open circuit condition occurs across the first and second line terminals.

4 Claims, 3 Drawing Sheets

POWER FEED CIRCUIT FOR DIGITAL COMMUNICATIONS TERMINAL EQUIPMENT

FIELD OF THE INVENTION

The invention is in the field of power feed apparatus and methods for supplying transmission line connected terminals with energizing current. More particularly the invention relates to apparatus and methods for powering a digital signal telecommunications terminal equipment wherein an initial power-up current in-rush may exceed a normal load current by many times.

BACKGROUND OF THE INVENTION

Traditionally a telephone terminal apparatus, for example telephones and the like, is coupled through an associated telephone line with a central power source via a line interface circuit. The line interface circuit includes circuitry, usually of a resistive nature, for feeding energizing direct current from the central power source to the telephone terminal apparatus. Recently, various active line interface circuits have been developed wherein the function of feeding the energizing direct current is performed by active elements which may optimize the coupling of the telephone with an associated telephone system. Such active line circuits may include over current protection circuitry which responds to unintended operational faults, for example power line crosses, short circuits or ground faults, by somewhat limiting current flow in the interest of preventing catastrophic failure of line interface circuit.

Recently telephone terminal apparatus of a digital nature have been developed to take advantage of the recommended Integrated Services Digital Network (ISDN) standard. In ISDN jargon a terminal apparatus is usually referred to as a terminal equipment (TE), a line interface circuit as a network termination (NT1), and a line for connection between a NT1 and a TE as a terminal (T) interface, hereafter referred to as a T bus. The TEs are characterized by digital circuitry requiring an operating voltage or voltages not conventionally available from an associated telephone facility. However the traditional reliability of telephony service is never the less preferred. Hence one arrangement is provided wherein a convenient physical location for a group of NT1s is also provided with a line power source, which is intended to be more reliable than the supply service expected from a local electrical utility. Each of the NT1s is provided with power from the line power source, at a potential of about 50 volts, so that energizing direct current is made available to each associated TE via the wires of the interconnecting T bus. A typical TE includes a direct current to direct current (DC to DC converter which utilizes between about 40 to 60 milliamperes of current from the T bus to provide the required voltage or voltages for normal operation. However initiation of operation of a TE, such as when it is first plugged into a T bus or when power is initially applied at the NT1, typically draws a momentary surge of current. The surge of current is that which is required to initiate operation of the typical DC to DC converter and associated filter capacitors. In a normal power up event in a TE, the DC to DC converter usually draws a current peak or current inrush, which may exceed an ampere for as much as ten milliseconds. In such circumstances the typical current limiting circuit intended to protect the typical line interface circuit is inappropriate for operation throughout the whole current load regime. For example, if a current limit of twice the normal operating current is set, there will be insufficient current for start up of the DC to DC converter and on the other hand if a current limit sufficiently great to accommodate start up is set, a fault may be permitted to draw current for a period of time sufficient to seriously jeopardize the operations of the NT1 physically adjacent, and the line power source circuits.

It is an object of the invention to supply operating current from a central line power source via a line interface circuit, to a terminal equipment having a DC to DC converter, while providing an over current protection feature which is effective across the entire load current regime of the terminal equipment.

SUMMARY OF THE INVENTION

In accordance with the invention, a current control apparatus is provided for supplying an energizing direct current flow from a source of power via a transmission line to a telecommunications terminal apparatus being continuously operable while drawing a load current which is exceeded by an inrush current being greater than the load current at a moment of power up. The current control apparatus is for connection in series between the power source and the transmission line and comprises: means for generating a magnitude signal being representative of an amount of said energizing direct current flow; means for generating a static control signal for defining a maximum limit of load current; means for generating a momentary dynamic control signal for defining a maximum limit of the inrush current in response to the magnitude signal increasing from a level representative of less than the maximum limit of load current to a level representative of more than the maximum limit of load current; and switch means responsive to the magnitude signal and the static and dynamic control signals, to be set in an ON condition for conducting said current flow, when either one of said maximum limits is greater than the energizing direct current as is instantly represented by the magnitude signal, otherwise to be reset in an OFF condition, and while in the OFF condition being responsive to an apparent open circuit condition of the transmission line to become set in the ON condition.

In one example, a line interface circuit couples energizing direct current, from a line power supply to a communications line, for operation of a telecommunications terminal apparatus. The line interface circuit comprises: first and second power terminals for connection to the line power supply; first and second line terminals for connection to the communication line; and a current control means, being connected between a one of the first and second power terminals and a respective one of the first and second line terminals, for conducting the energizing direct current there between, for temporarily isolating the power terminal from the line terminal to stop an inrush current in excess of a dynamic limit, and permanently isolating the power terminal from the line terminal to stop a load current in excess of a static limit, until a virtual open circuit condition occurs across the first and second line terminals.

Also in accordance with the invention a method is provided for supplying an energizing direct current flow, from a source of power via a transmission line to a telecommunications terminal apparatus, said terminal apparatus being continuously operable while drawing a load current which is exceeded by an inrush current being greater than the load current at a moment of power up. The method comprising the steps of:

a) generating a magnitude signal being representative of an amount of said energizing direct current flow;

b) generating a static control signal for defining a maximum limit of load current;

c) generating a momentary dynamic control signal for defining a maximum limit of the inrush current in response to the magnitude signal increasing from a level representative of less than the maximum limit of load current to a level representative of more than the maximum limit of load current;

d) in response to the magnitude signal and the static and dynamic control signals, providing a path with an impedance of less than a first value suitable for conducting the energizing current flow, when either one of said maximum limits is greater than the energizing direct current as is instantly represented by the magnitude signal, otherwise increasing the impedance of said path to a second value greater than the first value and unsuitable for conducting the energizing current flow; and e) while said path is of at least the second impedance value and in an event where the transmission line appears to be an open circuit, reducing the impedance of the path to less than the first value.

BRIEF DESCRIPTION OF THE DRAWINGS

An example embodiment is described with reference to the accompanying drawings in which.

DESCRIPTION OF THE EXAMPLE EMBODIMENT

Figure 1:
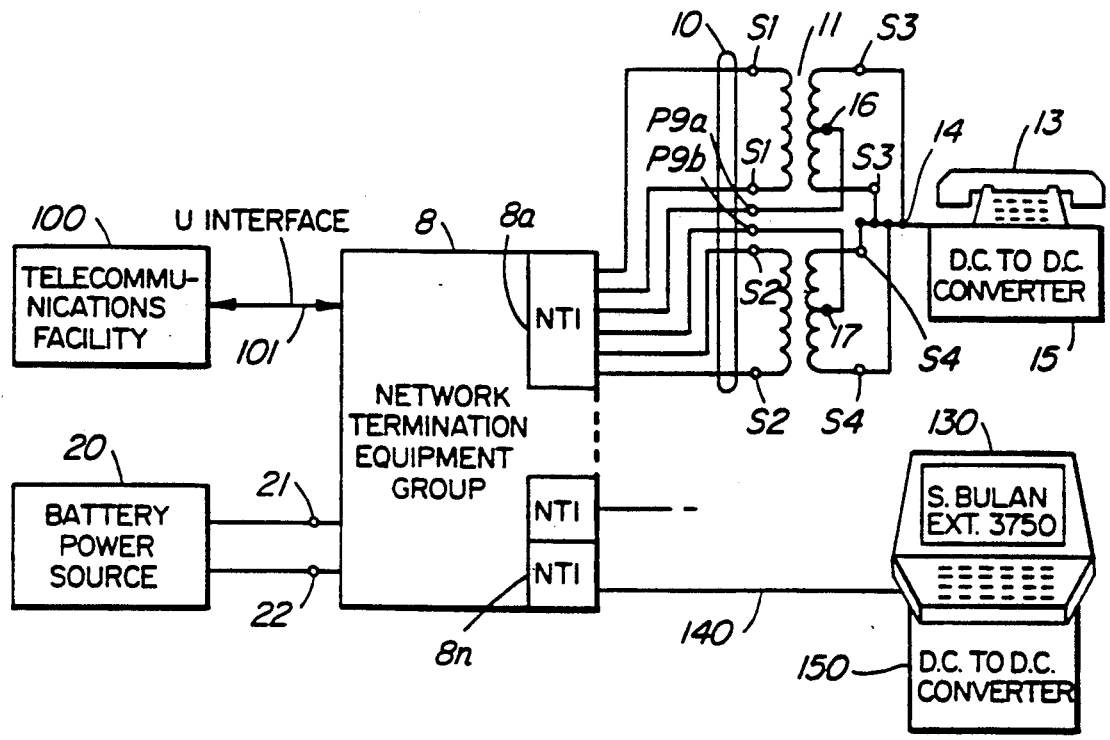
FIG. 1 is a block schematic diagram of a telecommunications facility and a network termination equipment group for coupling terminal equipment thereto.

FIG. 1 illustrates a typical connection of several terminal equipments (TE) shown at 13 and 130. Each TE has associated with it a DC to DC converter, 15 and 150 respectively. Each TE is connected to a telecommunications facility 100 via a U interface 101. The U interface 101 is a digital signals link which typically conforms to a telephony standard such as the well known T1E1 transmission standard. The U interface 101 transports signals between the telecommunications facility 100 and a network termination equipment group 8. These signals are distributed on a predetermined basis across a group of network terminations (NT1) shown at 8a through 8n. A battery power source 20 supplies termination equipment power for operation of each of the NT1s 8a through 8n, and in this example supplies line power for the operations of the TEs 13 through 130 via positive and negative power terminals 22 and 21 respectively. Each of the NT1s is connected via a group of leads 10 as illustrated with respect to the terminal equipment 13. This is usually a transformer connection as is illustrated by transformer windings 11 with sending terminals S1 and S3 and receiving terminals S2 and S4 connected to a 4 wire T bus 14, as shown. Power terminals at P9a and P9b are connected to centre taps 16 and 17 of the transformer windings 11 in a well known phantom power feed arrangement. In like manner the TE 130 is connected via a T bus 140. In an alternate arrangement, not shown, an additional two wires may be provided in the T bus to separately power the TE via the terminals P9a and P9b. In the alternate arrangement the transformer 11 is spared the chore of having to conduct dc current via its winding portions.

Figure 2:
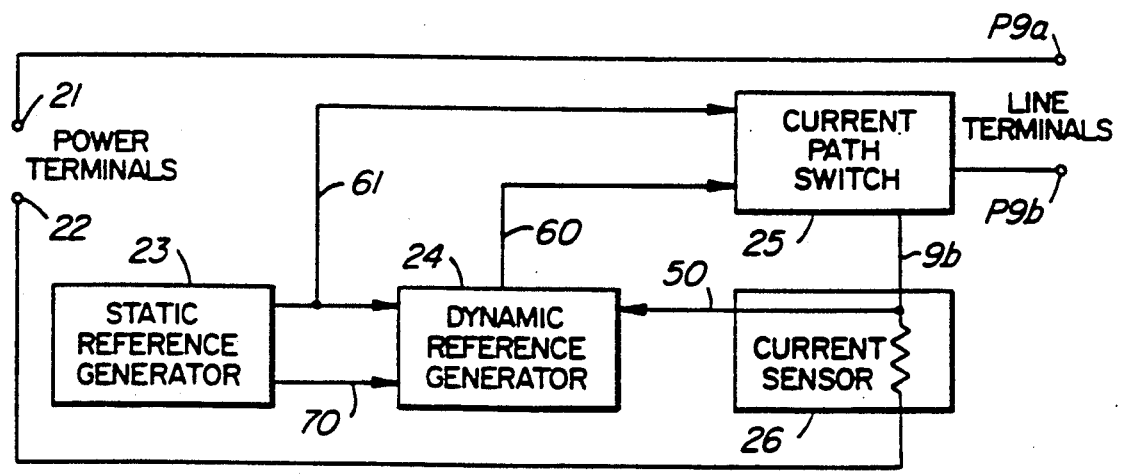
FIG. 2 is a block schematic diagram of a line interface circuit, used in the network termination equipment group shown in FIG. 1 in accordance with the invention.

Each of the NT1s includes a line interface circuit for coupling current from the power source 20, hereinafter referred to as the line power supply 20, to its associated T bus. The line interface circuit is generally illustrated in FIG. 2. In FIG. 2, the positive power terminal 21 is connected directly to the line terminal P9a. However the negative power terminal 22 is connected via a current sensor 26, a current path 9b, and a current path switch 25 to the line terminal P9b. A static reference generator 23 provides a negative voltage reference on a lead 70 for use by a dynamic reference generator 24. The static reference generator 23 also provides a stable voltage supply on a lead 61 for use by the dynamic reference generator 24 and the current path switch 25. The dynamic reference generator 24 is provided with a sense signal on a lead 50 connected from the current sensor 26. The dynamic reference generator uses the signals on the lead 70 and 50 to generate a control signal on a lead 60 for use by the current path switch 25. The current path switch is required to provide a current path which at any one time is of a very low impedance, or alternately is of a much higher impedance, in accordance with dynamics of the ongoing operation of the MJ1 and any TE connected thereto. Operation of the line interface circuit is discussed in more detail with reference to FIGS. 3, 4 and 5.

Figure 3:
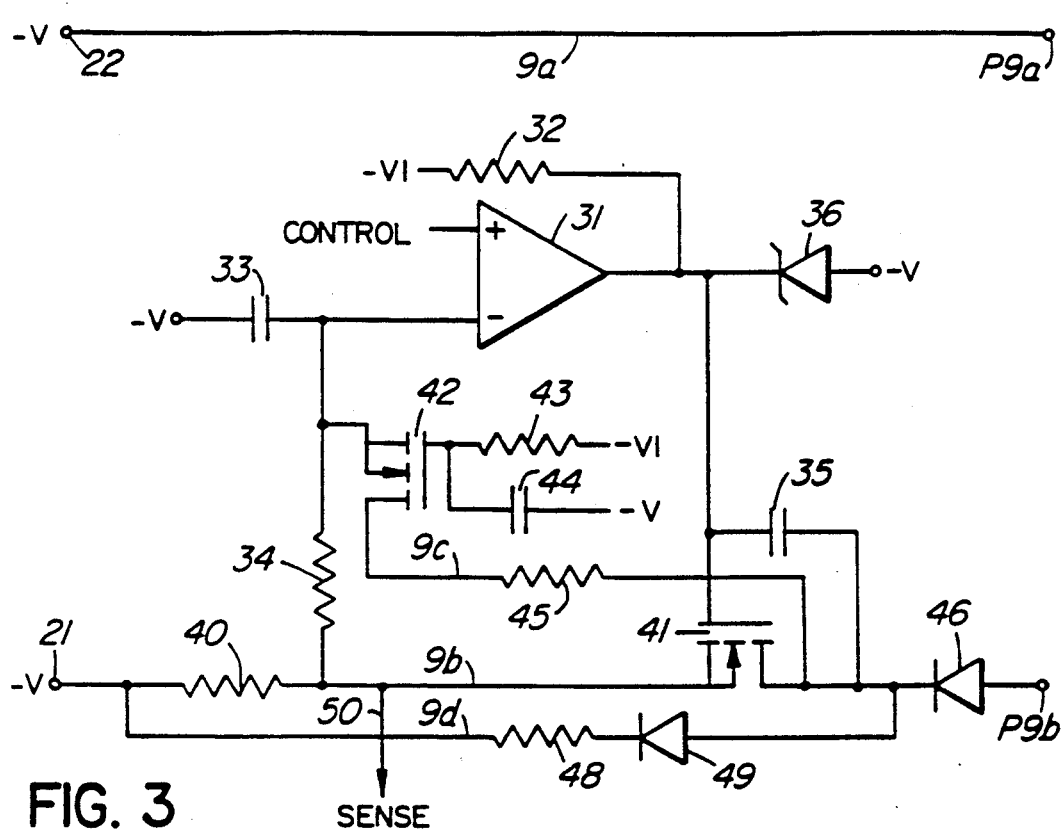
FIG. 3 is a schematic diagram which illustrates a detailed example of a current switch used in the line interface circuit illustrated in FIG. 2.

Referring to FIG. 3, a differential amplifier 31 includes an open collector output connected as shown with a resistor 32, a capacitor 35 and a zener diode 36 to control conduction of energizing current for an associated TE via an enhancement mode field effect transistor (FET) 41. The FET 41 is connected as part of the current path 9b in series between a diode 46 and a current sensing device in this case a resistor 40, as shown. An initializing circuit path 9c includes a FET 42 connected as shown with resistors 43 and 45 and a capacitor 44. An inverting input of the differential amplifier 31 is connected with a capacitor 33, a resistor 34 and the FET 42. A non-inverting input of the differential amplifier 31 is connected to receive a control signal. While the FET 42 is ON, the current path 9c in combination with the resistor 34 establishes a positive feedback path from a junction of the resistor 40 and the FET 41, to the inverting input of the differential amplifier 31. A secondary current path 9d is provided by a resistor 48 connected in series with a diode 49 and the diode 46. When the FET 41 is switched OFF as in response to an over current condition, the secondary current path 9d provides a small trickle of current which flows via the terminals P9a and P9b when these terminals are other than effectively open circuited. In an event wherein the trickle current ceases to flow the Fet 41 may be returned to the ON condition. The circuit, so arranged, is operable to maintain the FET 41 in an ON condition as long as the voltage at the inverting input is less positive than the voltage of the control signal at the non-inverting input of the differential amplifier 31.

Figure 4:
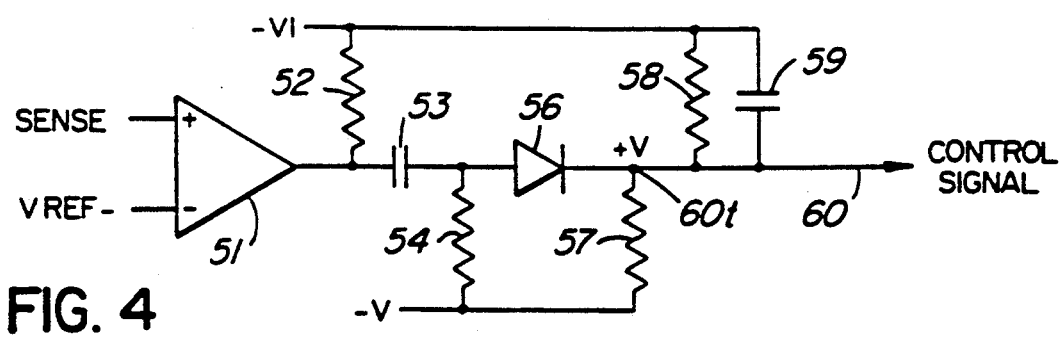
FIG. 4 is a schematic diagram which illustrates a detailed example of a dynamic reference generator used in the line interface circuit illustrated in FIG. 2.

The dynamic reference generator in FIG. 4 includes a differential amplifier 51 having an inverting input and a non-inverting input. The differential amplifier 51 in this example includes an open collector output connected as shown to a series arrangement of resistors 52 and 54 and a capacitor 53. A junction of the resistor 54 and the capacitor 53 is connected to an anode electrode of a diode 56. A cathode electrode of a diode 56 is connected to a junction of resistors 57 and 58 arranged in series.

Figure 5:
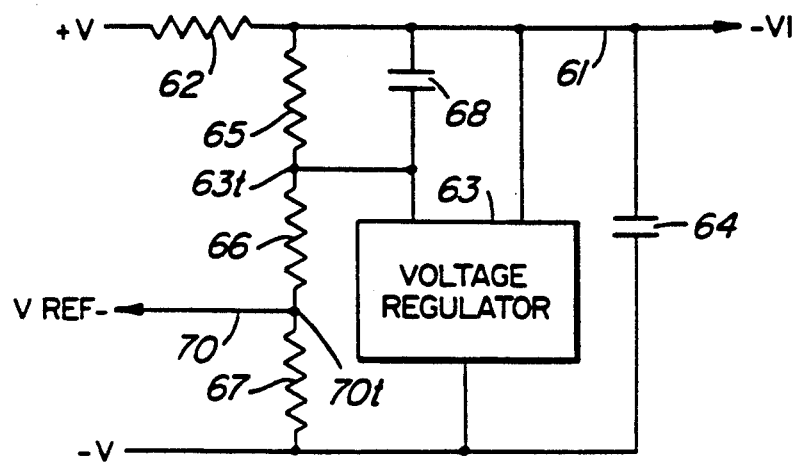
FIG. 5 is a schematic diagram which illustrates a detailed example of a static reference generator used in the line interface circuit illustrated in FIG. 2.

The static reference generator, in FIG. 5, is used to provide a stable supply voltage supply $-V1$ and a reference voltage V REF$-$. The static reference generator is shown to be connected across the power terminals 22 and 21 to receive current across a potential $+V$, $-V$ from the battery power source. A resistor 62 is connected as shown in a shunt combination with a voltage regulator 63 to provide the intermediate voltage $-V1$ on a lead 61. In this case, the intermediate voltage $-V1$ is about 10 volts more positive than the potential $-V$. Resistors 65, 66 and 67 are connected in series and provide a controlled potential at a first voltage tap 63$t$ for operation of the voltage regulator 63. A second voltage tap provides a voltage V REF$-$ which is about a volt more positive than the potential $-V$. Capacitor 68 and 64 provide filtering.

Figure 6:
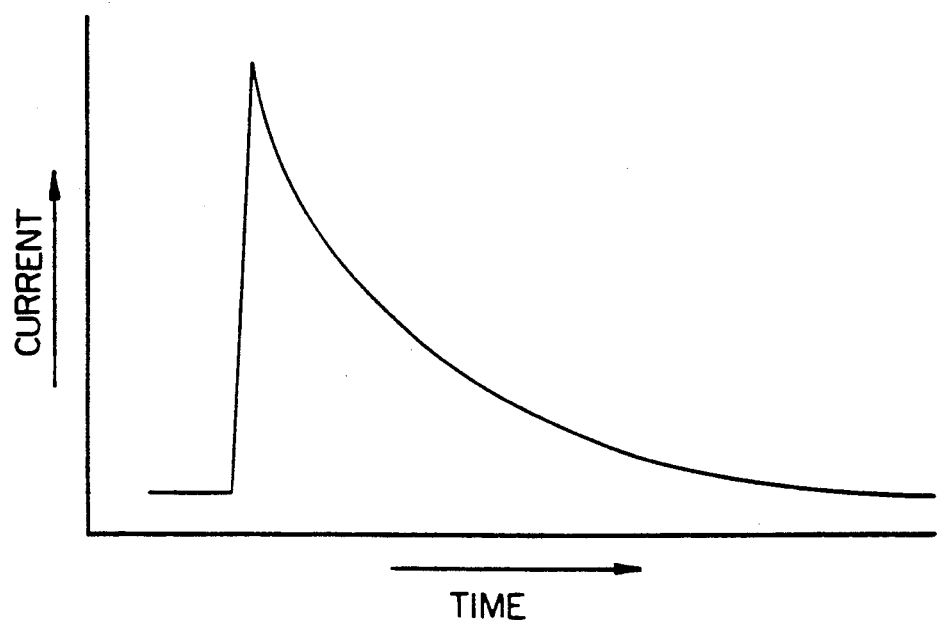
FIGS. 6 and 7 are graphical representations of current limiting events which may occur during operation in accordance with the invention of the interface circuit as illustrated in FIGS. 2 to 5.
Figure 7:
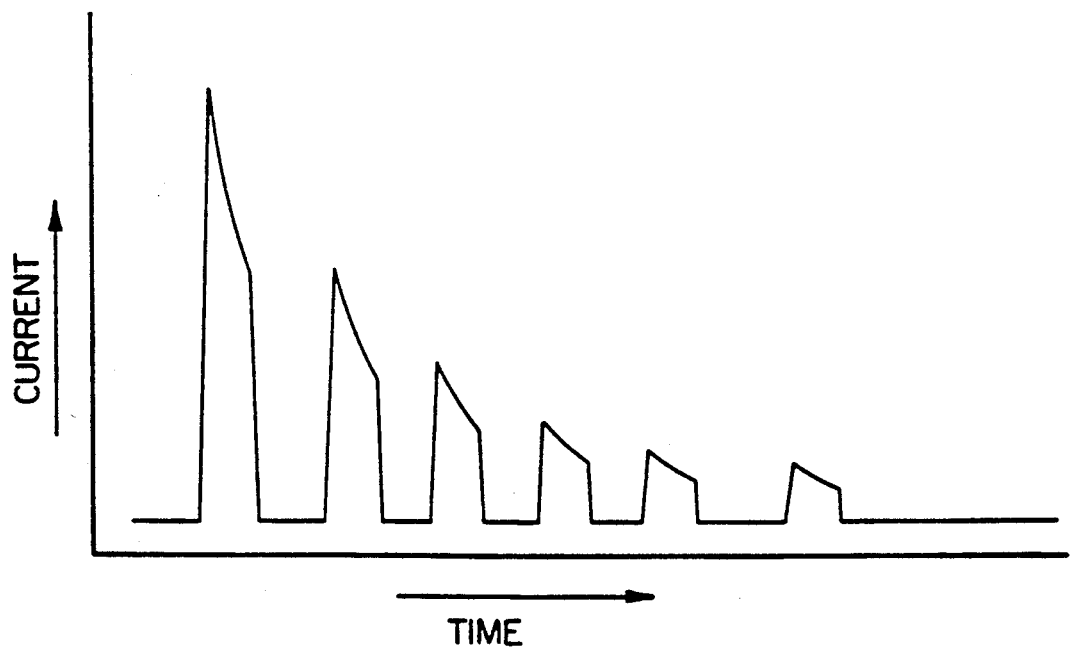

Operation of the dynamic reference generator 24 shown in FIG. 4 is as follows. With reference to the differential amplifier 51, assuming that its inverting input is more positive than its non-inverting input, its output then assumes a potential near that of $-V$. Alternately in an event where the sense voltage (50) becomes greater than the potential of V REF$-$, the output of the differential amplifier 51 becomes a high impedance. Hence a positive going pulse, with an edge of near 10 volts with respect to $-V$, is coupled across the capacitor 53. The amplitude of the pulse edge is determined by ohmic values of the resistors 52 and 57 in a voltage divider arrangement. Following the pulse edge, a falling or decay portion is characterized by the RC value of the capacitor 53 and the resistors 57 and 52. The pulse is transmitted via the diode 56 until its amplitude approaches to within the forward voltage drop, of the diode 56, with respect the normal voltage at a junction 60$t$. As time passes, the potential of the pulses further reduced and the diode 56 becomes non-conductive. Of course, if at any time during the decay portion the sense signal becomes less than the potential of V REF$-$, the output of the differential amplifier 51 swings toward the $-V$ potential, thereby terminating the pulse. While the pulse is terminating, a capacitor 59 extends and smooths the terminating portion of the pulse. If however the sense signal again rises in a few moments, the pulse is reinitiated with an amplitude reduced by an amount generally as characterized by said RC value. The resistor 54 discharges the capacitor 53 when the pulse is terminated such that after about five or more time constants a full amplitude pulse will be generated. This is illustrated in FIG. 6 and FIG. 7 wherein FIG. 6 shows a typical continuous pulse, and FIG. 7, shows an interrupted pulse. The control signal at the output 60 is therefore a static level as determined by the potential at the junction 60$t$, unless the potential is over-ridden by the dynamic level switched via the diode 56 to the output 60.

Referring to FIG. 3, the current path switch operates in response to a sample of the voltage sensed across the resistor 40 and the control signal provided on the lead 60. In an event where power is first applied across the power terminals 21 and 22 from the line power supply 20 as illustrated in FIG. 1, the FET 42 is initially maintained in an OFF condition by voltage at the junction of the capacitor 44 and the resistor 43. This voltage rises in accordance with the RC time constant of these elements toward the potential $-V1$ to switch the FET 42 into the ON condition which persists during the rest of the circuit function, as long as power is not interrupted. Hence positive feedback, normally coupled via a current path 9$c$, is suppressed for the moment shortly after the initial power application at the power terminals 21 and 22, to prevent a premature locking of FET 41 into a permanent OFF state, that is before all operating static voltages have stabilized. The inrush of current generates a very much more positive voltage on the sense lead 50 which causes the dynamic reference generator to generate a positive going pulse control signal, which in turn tends to maintain the FET 41 in the ON condition. Voltage appearing at the inverting input of the differential amplifier 31 is developed across the resistor 40 and the capacitor 33 and rises in accordance with the RC time constant of the resistors 34 and 40 and capacitor 33, so that the differential amplifier 31 is prevented from responding too quickly to the rising amplitude of the sensed current in the current path 9$b$. This permits the control signal pulse to be generated before it is compared to the sensed current by the differential amplifier 31. If the sensed inrush of current does not exceed the permissible level as set by the control signal, the FET 41 is maintained in the ON state. However, if the sensed current exceeds the control signal permissible level, the FET 41 is controlled by the differential amplifier 31 to be in a less conductive state. This causes a rise in the voltage level in the path 9$c$ which is impressed upon the inverting input of the differential amplifier 31 and thereby causes the FET 41 to be locked OFF. While the may be FET 41 locked OFF the trickle current is conducted via the current path 9$d$. This condition is maintained until an effective external open circuit condition is established across the terminals P9$a$ and P9$b$. The open, indicated by an absence of the trickle current, circuit condition is characteristic of the impedance presented at the power feed terminals of a typical DC to DC converter in the event it has failed to function due to insufficient voltage supply. The diode 49 may be of a light emitting type to give a visual indication of an occurrence of the trickle current. In the event that the open circuit condition is established, the trickle current fails to flow on the path 9$d$ and hence the voltage in the path 9$c$ tends toward the $-V$ level. In this case the differential amplifier 31 again switches the FET 41 ON, into the conduction state.

FIGS. 6 and 7 show the extremes of wave shapes which the control signal in the lead 60 may assume. These wave forms are presented in terms of the dynamic current characteristics of the circuit as these would be sensed across the resistor 40, in FIG. 3. Referring to FIG. 6, current is shown on a vertical axis and time is represented on the horizontal axis. Assuming an inrush of current at the power terminals P9$a$ and P9$b$, the maximum permissible limit rises abruptly to a peak whereafter the limit is reduced exponentially in accordance with the RC time constant previously discussed in relation to FIG. 4. If however the current demand at the terminals P9a and P9b falls to less than the static threshold as determined by the V REF− potential on lead 70, then as shown in FIG. 7, the maximum permitted current returns to the normal operating current level. If however the apparatus during start up requires several inrushes, the maximum permitted current will return to a high point of slightly more than the current which was permitted just before the envelope returned to the normal load current level. This may happen several times, as may be peculiar to the particular terminal equipment being connected to the line.

As before mentioned, FIGS. 6 and 7 show the extremes of operation, however there are various scenarios which are not illustrated here as these will be observable by a person having constructed and used the invention.

The illustrated embodiment is achieved by a combination of analog circuit elements. However, it will be apparent to persons of typical skill in the electronic arts that the functionality of the invention may also be achieved by means of a suitably interfaced and programmed digital controller or microcomputer, a binary output of which may be used to control the FET 41 in place of the amplifier 31 and the circuits illustrated in the FIGS. 4 and 5.

We claim:

1. A line interface circuit, for coupling energizing direct current, for operation of a telecommunications terminal apparatus, from a line power supply to a communications line, the line interface circuit comprising:
   first and second power terminals for connection to the line power supply;
   first and second line terminals for connection to the communication line; and
   a current control means, being connected between a one of the first and second power terminals and a respective one of the first and second line terminals for conducting the energizing direct current therebetween, for temporarily isolating the power terminal from the line terminal to stop an inrush current in excess of a dynamic limit, and permanently isolating the power terminal from the line terminal to stop a load current having been in excess of a static limit, until a virtual open circuit condition occurs across the first and second line terminals.

2. A line interface circuit as defined in claim 1 wherein the current control means comprises:
   current sensing means for generating a magnitude signal being representative of an amount of said energizing direct current being conducted via one of the first and second line terminals;
   first means for generating a static control signal for defining the static limit of load current;
   second means for momentarily generating a dynamic control signal for momentarily defining the dynamic limit of the inrush current in response to the magnitude signal abruptly increasing to a level which exceeds the static limit; and
   switch means being connected in series between the power terminal and the line terminal, and being responsive to the magnitude signal and the static and dynamic control signals,
   to be switched ON to conduct the energizing current when either one of said static and dynamic limits is greater than an instant value of the magnitude signal,
   and otherwise to become switched OFF, and in this event becoming switched ON, solely in response to an apparent open circuit condition at the first and second terminals.

3. A current control means for supplying an energizing direct current flow, from a source of power via a transmission line to a telecommunications terminal apparatus, said terminal apparatus being continuously operable while drawing a load current which is exceeded by an inrush current being greater than the load current at a moment of power up, the current control apparatus being for connection in series between the power source and the transmission line and comprising:
   means for generating a magnitude signal being representative of an amount of said energizing direct current flow;
   means for generating a static control signal for defining a maximum limit of load current;
   means for generating a momentary dynamic control signal for defining a maximum limit of the inrush current in response to the magnitude signal increasing from a level representative of less than the maximum limit of load current to a level representative of more than the maximum limit of load current;
   switch means responsive to the magnitude signal and the static and dynamic control signals, to be set in an ON condition for conducting said current flow, when either one of said maximum limits is greater than the energizing direct current as is instantly represented by the magnitude signal, otherwise to be reset in an OFF condition, and while in the OFF condition being responsive to an apparent open circuit condition of the transmission line to become set in the ON condition.

4. A method for supplying an energizing direct current flow, from a source of power via a transmission line to a terminal apparatus, said terminal apparatus being continuously operable while drawing a load current which is exceeded by an inrush current being greater than the load current at a moment of power up of said terminal apparatus, the method comprising the steps of:
   a) generating a magnitude signal being representative of an amount of said energizing direct current flow;
   b) generating a static control signal for defining a maximum limit of the load current;
   c) generating a momentary dynamic control signal for defining a maximum limit of the inrush current in response to the magnitude signal increasing from a level representative of less than the maximum limit of load current to a level representative of more than the maximum limit of load current;
   d) in response to the magnitude signal and the static and dynamic control signals, providing a path with an impedance of less than a first value suitable for conducting the energizing current flow, when either one of said maximum limits is greater than the energizing direct current as is instantly represented by the magnitude signal, otherwise increasing the impedance of said path to a second value greater than the first value and unsuitable for conducting the energizing current flow; and
   e) while said path is of at least the second impedance value and in an event where the transmission line appears to be an open circuit, reducing the impedance of the path to less than the first value.

* * * * *